United States Patent
Garbow et al.

(10) Patent No.: US 7,490,354 B2
(45) Date of Patent: Feb. 10, 2009

(54) VIRUS DETECTION IN A NETWORK

(75) Inventors: Zachary Adam Garbow, Rochester, MN (US); Michael David Gordon, Rochester, MN (US); Robert Hart Hamlin, Rochester, MN (US); William Russell Marshall, Rochester, MN (US); Clayton Lee McDaniel, Rochester, MN (US); Emuejevoke Jane-Frances Sanomi-Fleming, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/865,252

(22) Filed: Jun. 10, 2004

(65) Prior Publication Data

US 2006/0005244 A1     Jan. 5, 2006

(51) Int. Cl.
*G06F 11/00* (2006.01)
(52) U.S. Cl. .................. 726/24; 726/22; 726/23; 713/189; 713/190; 713/191; 705/51; 705/52; 705/53; 705/54; 717/174; 717/175; 717/176; 717/177; 717/178
(58) Field of Classification Search .............. None
See application file for complete search history.

(56) References Cited

U.S. PATENT DOCUMENTS

| | | | | |
|---|---|---|---|---|
| 6,154,844 | A * | 11/2000 | Touboul et al. ............... 726/24 |
| 6,754,230 | B2 * | 6/2004 | Purpura et al. .............. 370/468 |
| 2002/0129277 | A1 * | 9/2002 | Caccavale ................... 713/201 |
| 2003/0126449 | A1 * | 7/2003 | Kelly et al. ................. 713/187 |

OTHER PUBLICATIONS

McAfee Software Stops Love Bug, Other E-mail Viruses, Jun. 6, 2000, pp. 1-4. i.t. matters, http://itmatters.com.ph/news/news_06062000d.html.

* cited by examiner

*Primary Examiner*—Nasser Moazzami
*Assistant Examiner*—Roderick Tolentino
(74) *Attorney, Agent, or Firm*—Owen J. Gamon

(57) ABSTRACT

A method that in an embodiment counts the number of times that a file or registry entry is added, changed, or deleted at clients in a network. If the count exceeds a threshold, then a warning is sent to the clients. The warning may prompt the clients to delete or rename the file or registry entry, run an anti-virus program, quarantine the file or registry entry, or issue a message. In this way, viruses may be detected at clients.

9 Claims, 5 Drawing Sheets

VIRUS DETECTION IN A NETWORK

FIELD

An embodiment of the invention generally relates to computers. In particular, an embodiment of the invention generally relates to virus detection in a network of computers.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Years ago, computers were isolated devices that did not communicate with each other. But, today computers are often connected in networks, such as the Internet or World Wide Web, and a user at one computer, often called a client, may wish to access information at multiple other computers, often called servers, via a network.

As computers have become more and more connected via networks, computers have become increasingly at risk for contracting computer viruses. A computer virus may be any malicious, unauthorized, or otherwise dangerous computer program or piece of code that "infects" a computer and performs undesirable activities in the computer. Some computer viruses are simply mischievous in nature. But, other viruses can cause a significant amount of harm to a computer and/or its user, including stealing private data, deleting data, clogging the network with many emails or transmissions, and/or causing a complete computer failure. Some viruses even permit a third party to gain control of a user's computer outside of the knowledge of the user, while others may utilize a user's computer in performing malicious activities such as launching denial-of-service attacks against other computers.

Viruses can take many different forms and can be spread in a wide variety of manners, e.g., as email attachments, macros or scripts, Trojan horses, worms, logic bombs, etc., all of which, for the purposes herein, will be referred to hereinafter as "viruses". Often, a virus will hide in, or "infect", an otherwise healthy computer program, so that the virus will be activated when the infected computer program is executed. Viruses typically also have the ability to replicate and spread to other computer programs, as well as other computers.

To address the risks associated with viruses, significant efforts have been directed toward the development of anti-virus computer programs that attempt to detect and/or remove viruses that attempt to infect a computer. Such efforts have resulted in a continuing competition where virus creators continually attempt to create increasingly sophisticated viruses, and anti-virus developers continually attempt to protect computers from new viruses.

One capability of many conventional anti-virus programs is the ability to perform virus checking on virus-susceptible computer files after the files have been received and stored in a computer, e.g., after downloading emails or executable files from the Internet. Server-based anti-virus programs are also typically used to virus check the files accessible by a server. Such anti-virus programs, for example, are often used by web sites for internal purposes, particularly download sites that provide user access to a large number of downloadable executable files that are often relatively susceptible to viruses.

There are several well-accepted methods for detecting computer viruses in memory, programs, documents or other potential hosts that might harbor them. One popular method, employed in many anti-virus products, is called "scanning." A scanner searches (or scans) the potential hosts for a set of one or more (typically several thousand) specific patterns of code called "signatures" that are indicative of particular known viruses or virus families, or that are likely to be included in new viruses. A signature typically consists of a pattern to be matched, along with implicit or explicit auxiliary information about the nature of the match and possibly transformations to be performed upon the input data prior to seeking a match to the pattern. The pattern could be a byte sequence to which an exact or inexact match is to be sought in the potential host. Unfortunately, the scanner must know the signature in order to detect the virus, and malicious persons are continually developing new viruses with new signatures, of which the scanner may have no knowledge.

In an attempt to overcome this problem, other methods of virus detection have been developed that do not rely on prior knowledge specific signatures. These methods include monitoring memory or intercepting various system calls in order to monitor for virus-like behaviors, such as attempts to run programs directly from the Internet without downloading them first, changing program codes, or remaining in memory after execution.

Despite all of these efforts at virus detection, viruses continue to plague computer users. Without a better way to detect computer viruses, users will continue to lose time and money detecting and recovering from malicious viruses.

SUMMARY

A method is provided that in an embodiment count the number of times that a file or registry entry is added, changed, or deleted at clients in a network. If the count exceeds a threshold, then a warning is sent to the clients. The warning may prompt the clients to delete or rename the file or registry entry, run an anti-virus program, quarantine the file or registry entry, or issue a message. In this way, viruses may be detected at clients.

DETAILED DESCRIPTION

Figure 1:
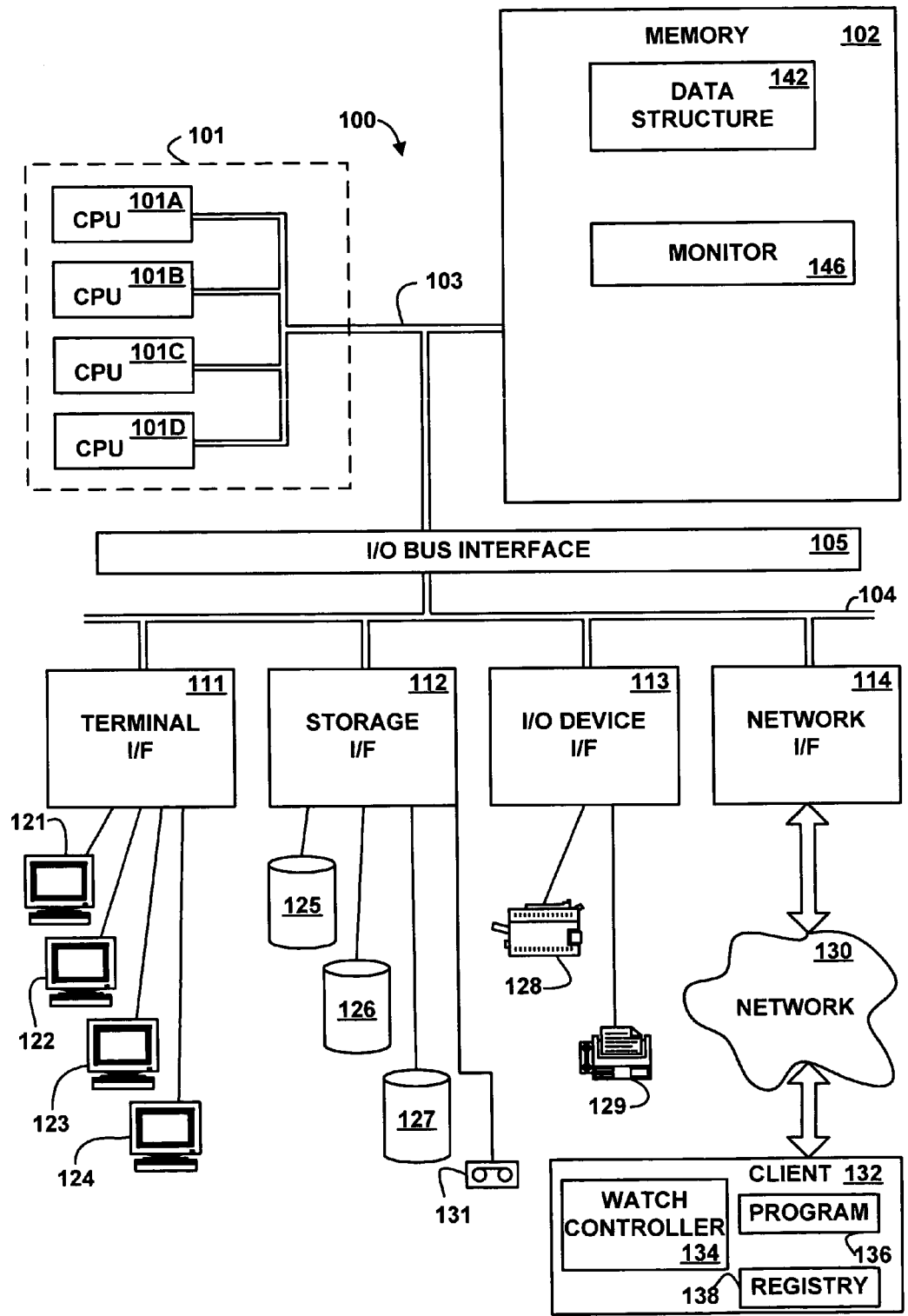
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a data structure 142 and a monitor 146. Although the data structure 142 and the monitor 146 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the data structure 142 and the monitor 146 are illustrated as residing in the memory 102, these elements are not necessarily all completely contained in the same storage device at the same time.

The monitor 146 receives notifications from the clients 132 via the network 130 regarding new and changed files and registry entries at the clients 132, saves data from the notifications in the data structure 142, and makes decisions regarding suspected viruses based on the data in the data structure 142. The data structure 142 is further described below with reference to FIG. 2.

In an embodiment, the monitor 146 includes instructions capable of executing on the processor 101 or statements capable of being interpreted by instructions executing on the processor 101 to perform the functions as further described below with reference to FIG. 4. In another embodiment, the monitor 146 may be implemented in microcode. In yet another embodiment, the monitor 146 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). The computer system 100 may use any appropriate operating system. In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 includes a watch controller 134, programs 136, and a registry 138. The watch controller 134 detects a new or changed file in the programs 136 or a new or changed entry in the registry 138 and, in response, sends a notification to the monitor 146. In another embodiment, the registry 138 is not present or not monitored by the watch controller 134. The programs 136 include potential hosts for viruses, such as code capable of being executed or instructions/statements capable of being interpreted via an unillustrated processor. The registry 138 includes configuration and profile information, such as user profiles, a list of the applications installed on the client 132, the types of documents that each application can create, a list of the hardware installed on the client 132, the ports being used, and/or the programs to be executed at the time the client 132 is powered on. Thus, an entry in the registry 138 may point to, identify, or otherwise designate a file in the programs 136 that may be a potential host for a virus.

The client 132 may further include some or all of the hardware components previously described above for the computer system 100. Although only one client 132 is illustrated, in other embodiments any number of clients may be present. The computer system 100 acts as a server for the clients 132.

It should be understood that FIG. 1 is intended to depict the representative major components of the computer system 100 and the client 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. I and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
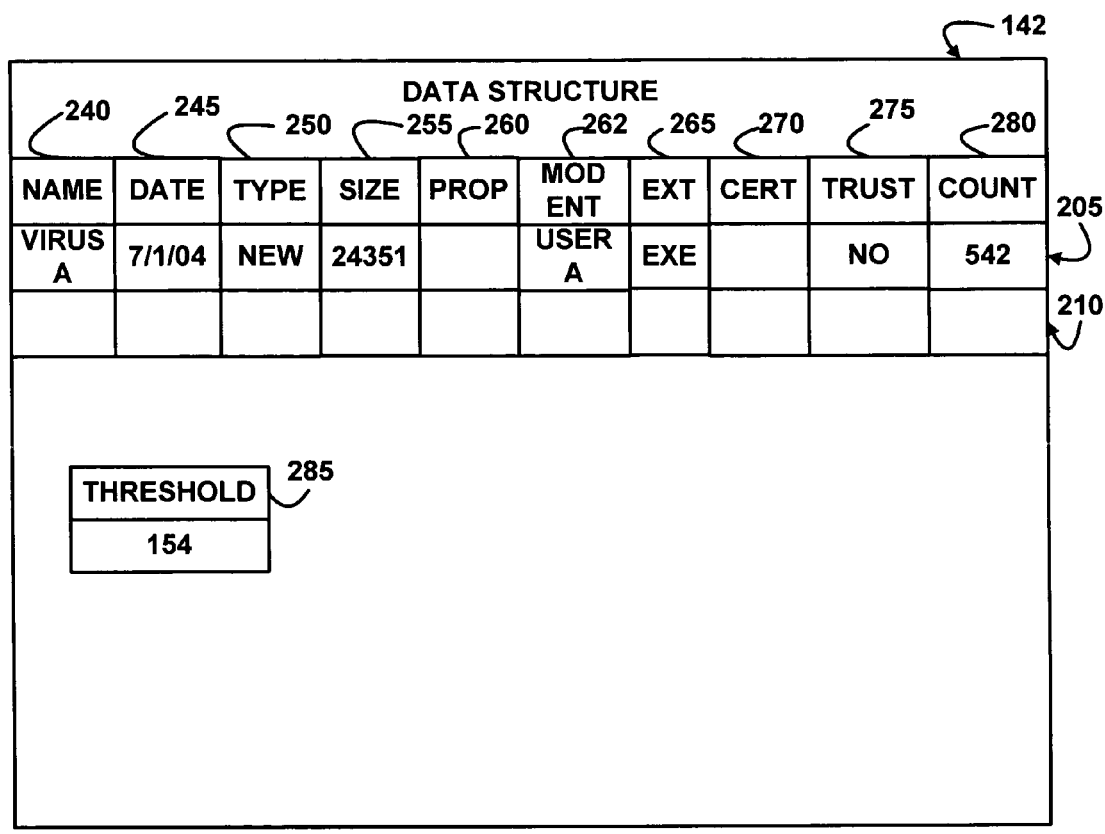
FIG. 2 depicts a block diagram of an example data structure, according to an embodiment of the invention.

FIG. 2 depicts a block diagram of an example data structure 142, according to an embodiment of the invention. The example data structure 142 includes records 205 and 210, but in other embodiments any number of records with any appropriate data may be presents. Each of the records 205 and 210 includes a name field 240, a date field 245, a type field 250, a size field 255, a properties field 260, a modifying entity field 262, an extension field 265, a certificate field 270, a trusted field 275, and a count field 280, but in other embodiments more or fewer fields may be present.

The name field 240 indicates the name or other identifier of a file or any other type of object in the programs 136 or an identifier of an entry in the registry 138 that was created, changed, or deleted. The date field 245 indicates the date and/or time that the file or entry identified by the name field 240 was created, changed, or deleted. The type field 250 indicates whether the file or entry was created, changed, or deleted. The size field 255 indicates the newly created or updated size of the file or entry. The properties field 260 includes any properties, characteristics, or attributes of the file or entry. The modifying entity field 262 identifies the user or program that added, changed, or deleted the file registry or other type of object identified by the name field 240. The extension field 265 indicates the extension of the file, such as exe, sys, dll, htm, or any other file extension. The certificate field 270 indicates any certificate of authenticity that is associated with the file or entry.

The trusted field 275 indicates whether the file or entry is trusted to not be a virus. In another embodiment, the trusted field 275 indicates whether the entity identified in the modifying entity field 262 is trusted not to introduce viruses. In various embodiments, a determination as to whether a particular file or entry is trusted to not be a virus may be made by the watch controller 134, the monitor 146, or a user of either the client 132 or the computer system 100, such as a system administrator or installer of the file or entry. For example, if a system administrator installs a new computer program in the clients 132, the system administrator may indicate in the trusted field 275 that the new computer program is trusted to not be a virus.

The count field 280 indicates the number of times that the monitor 146 has received notifications from the clients 132 that this file or entry has been created, updated, or deleted.

The example data structure 142 further includes a threshold 285, which indicates the number of additions, changes, or deletions to files or registry entries that will be tolerated before a virus is suspected. Although only one threshold 285 is illustrated, in another embodiment each of the records 205 and 210 has its own threshold, some or all of which may be different. In another embodiment, the threshold 285 may include both a high and low threshold, one of which is selected for use based on whether the trusted field 275 indicates that modifying entity 262 or the name 240 is trusted, as further described below with reference to FIG. 4.

Figure 3:
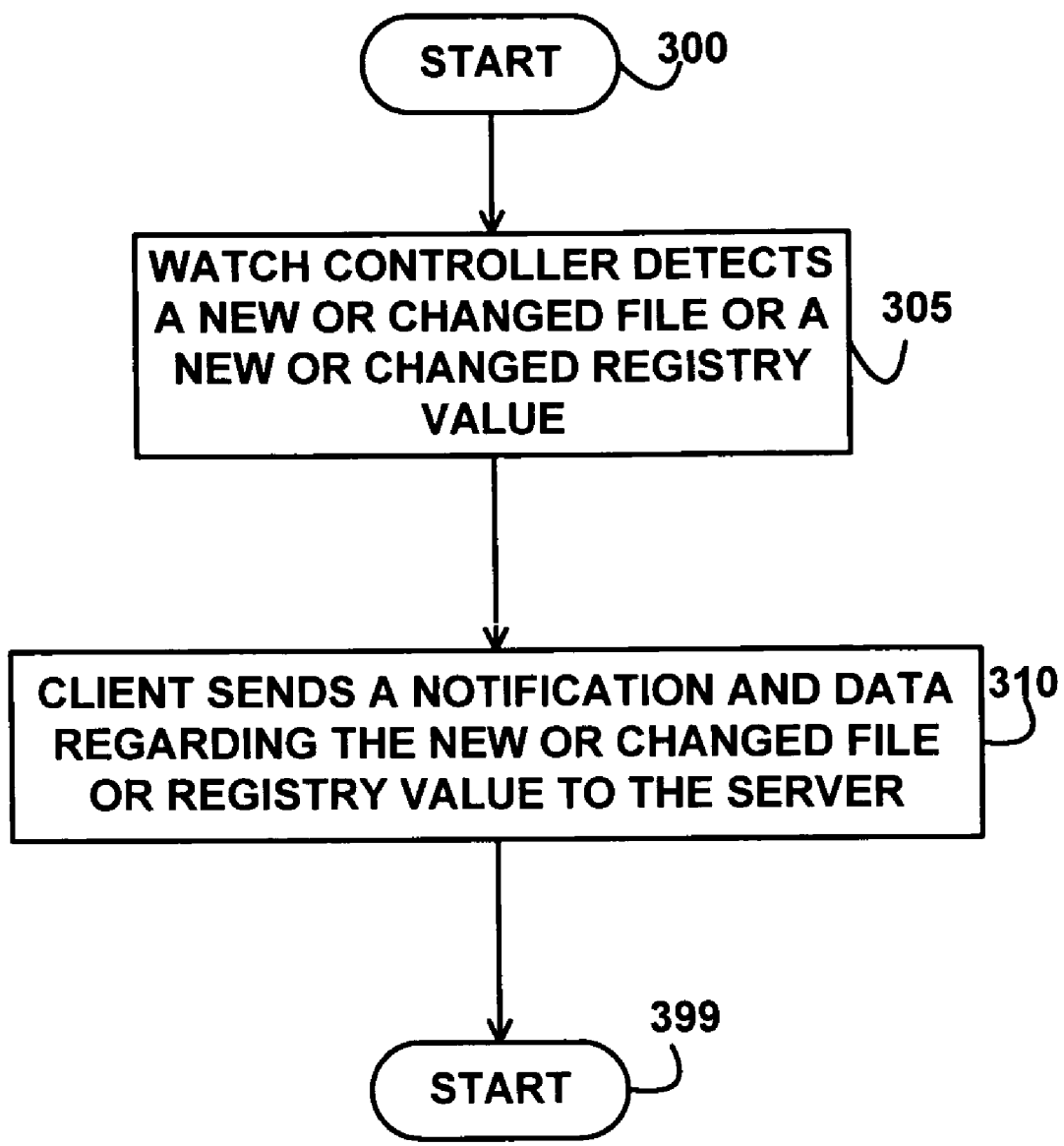
FIG. 3 depicts a flowchart of example processing for detecting changes at a watch controller, according to an embodiment of the invention.

FIG. 3 depicts a flowchart of example processing for detecting changes by the watch controller 134, according to an embodiment of the invention. Control begins at block 300. Control then continues to block 305 where the watch controller 134 detects a new, changed, or deleted file in the programs 136 or a new, changed, or deleted entry in the registry 138. The change in the file may be in the size of the file, the certificate of authenticity, or the date of modification, or any other appropriate change. Control then continues to block 310 where the watch controller 134 sends a notification and associated data regarding the new, changed, or deleted file or registry entry to the monitor 146. The associated data may include the name of the file or entry, the date of creation or modification, the type, the size, the properties, the modifying entity, the extension, the certificate of originality, all or in part, or any other appropriate data. Control then continues to block 399 where the logic of FIG. 3 returns.

Figure 4:
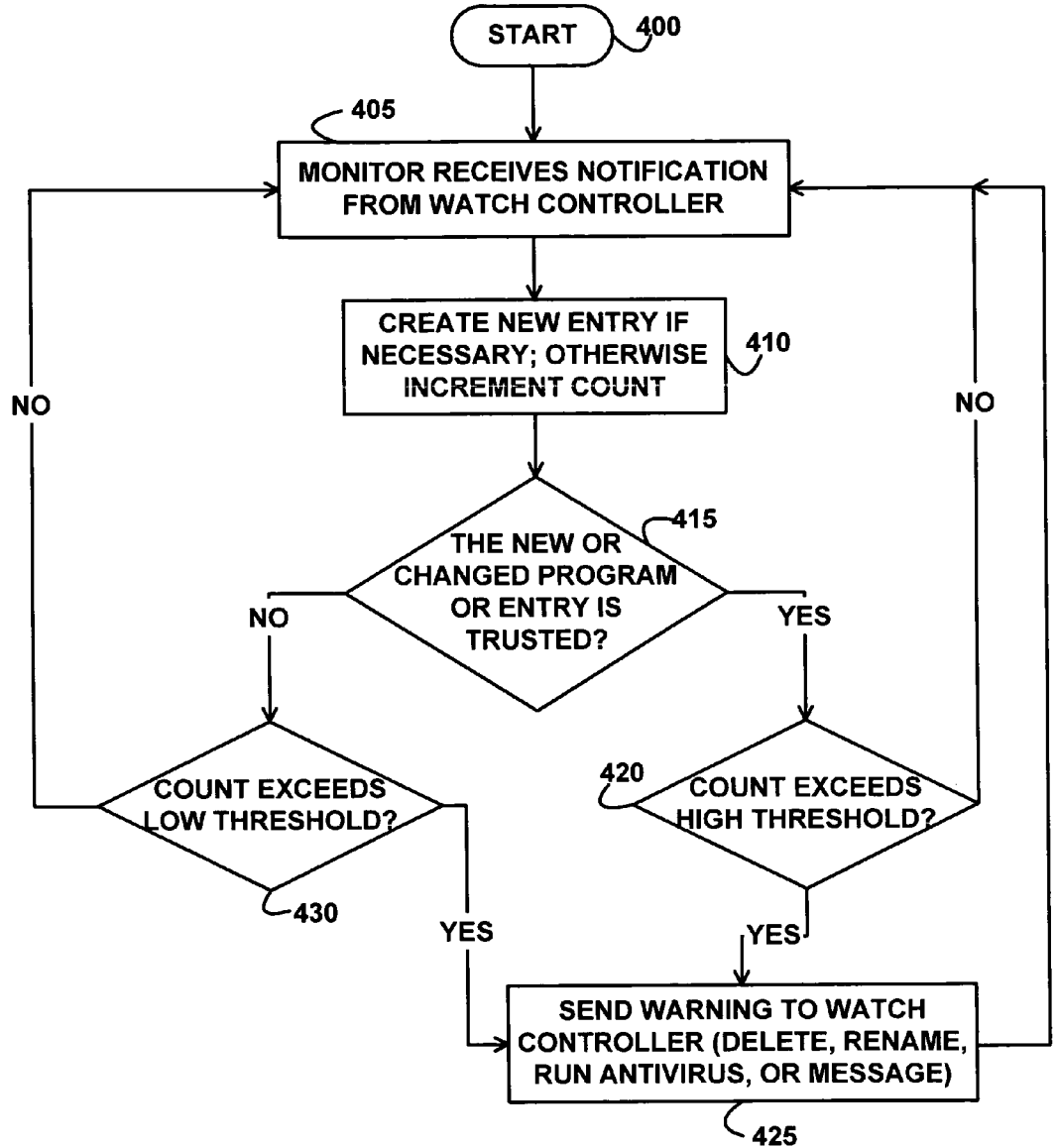
FIG. 4 depicts a flowchart of example processing for handling notifications of changes at a monitor, according to an embodiment of the invention.

FIG. 4 depicts a flowchart of example processing for handling notifications of changes by the monitor 146, according to an embodiment of the invention. Control begins at block 400. Control then continues to block 405 where the monitor 146 receives a notification and associated data from the watch controller 134 (previously sent at block 310, as described above) and searches for the name of the name of the file or entry supplied in the associated data in the data structure 142.

Control then continues to block 410 where the monitor 146 creates a new record in the data structure 142 if a record does not already exist. If the record already exists, then the monitor 146 increments the count 280 in the record. Control then continues to block 415 where the monitor 146 determines whether the new, changed, or deleted program or entry or the modifying entity 262 is trusted based on the trusted field 275. If the determination at block 415 is true, then the new, changed, or deleted program or entry is trusted or the modifying entity 262 is trusted, so control continues to block 420 where the monitor 146 determines whether the count 280 exceeds a high threshold.

If the determination at block 420 is true, then the count 280 exceeds the high threshold, so control continues to block 425 where the monitor 146 sends a warning to the watch controller 134. In an embodiment, the warning may include instructions to perform a specified action, such as instructions to perform a delete or rename of the suspected virus or host, instructions to run an anti-virus program, instructions to quarantine the suspected virus or host, or instructions to alert a user via a message or other notification. In another embodiment, the trusted field 275 is not present or not used, and the count 280 is compared to a single threshold 285. Control then returns to block 405, as previously described above.

If the determination at block 420 is false, then the count 280 does not exceed the high threshold, so control returns to block 405, as previously described above.

If the determination at block 415 is false, then the new, changed, or deleted program or entry or the modifying entity 262 is not trusted, so control then continues to block 430 where the monitor 146 determines whether the count 280 is greater than a low threshold, which is less than the high threshold. If the determination at block 430 is true, then the count 280 is greater than the low threshold, so control continues to block 425 where the monitor 146 sends a warning to the watch controller 134. In an embodiment, the warning may include instructions to perform a specified action, such as instructions to perform a delete or rename of the suspected virus or host, instructions to run an anti-virus program, instructions to quarantine the suspected virus or host, or instructions to alert a user via a message or other notification. Control then returns to block 405, as previously described above.

If the determination at block 430 is false, then the count 280 is not greater than the low threshold, so control returns from block 430 to block 405, as previously described above.

Figure 5:
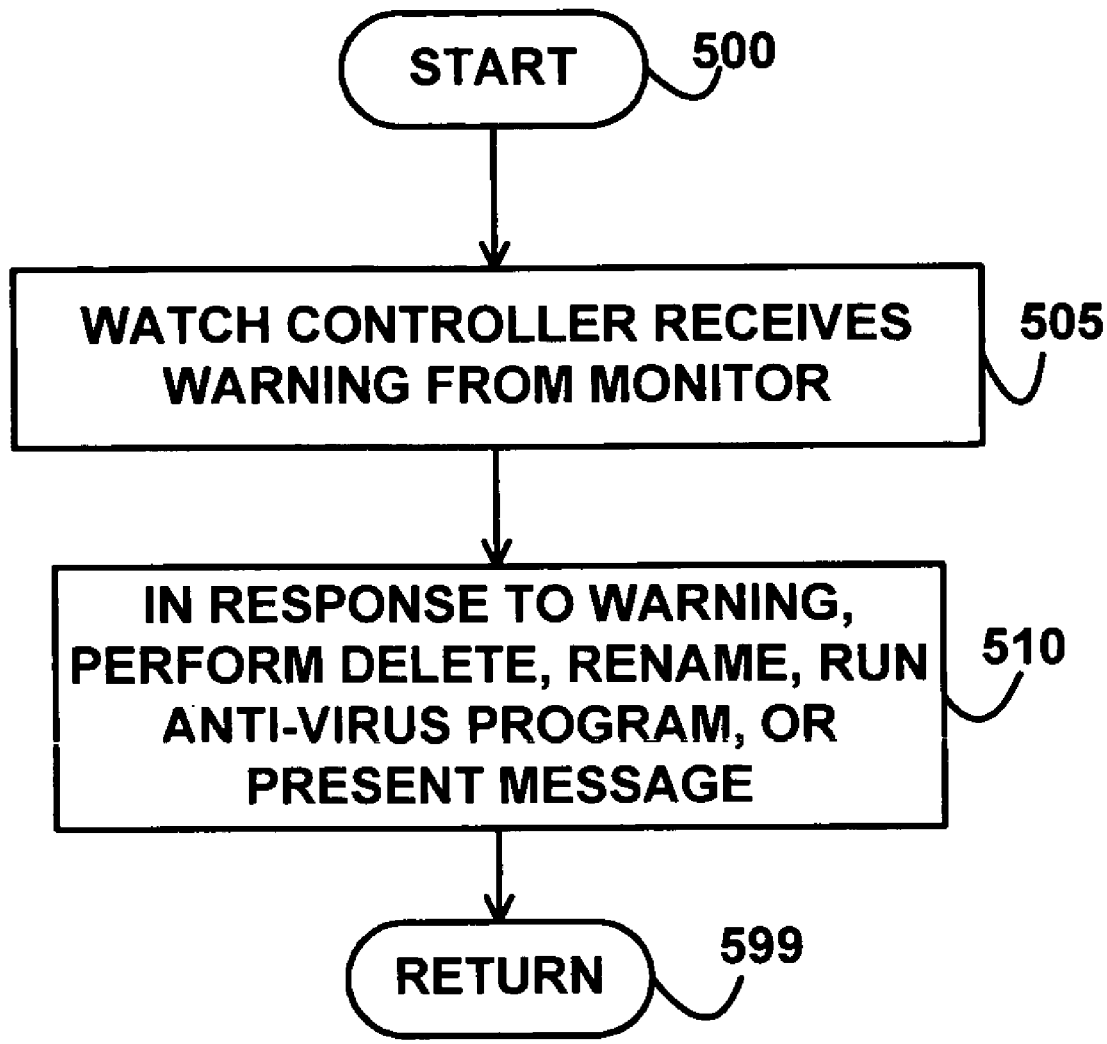
FIG. 5 depicts a flowchart of example processing for responding to warnings at a watch controller, according to an embodiment of the invention.

FIG. 5 depicts a flowchart of example processing for responding to warnings by the watch controller 134, according to an embodiment of the invention. Control begins at block 500. Control then continues to block 505 where the watch controller 134 receives a warning (previously sent at block 425) from the monitor 146. Control then continues to block 510 where, in response to the warning, the watch controller 134, in various embodiments, performs a delete or rename of the suspected virus or host (whether in a file or other object or referenced by a registry entry), runs an anti-virus program, quarantines the suspected virus or host, or presents a message or other notification to a user alerting the user to the problem, depending on a selection by the monitor 146, a selection of the watch controller 134, or any other criteria. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:

receiving a plurality of notifications from a plurality of clients in network, wherein each of the plurality of clients detected that an attribute of a file was changed, and wherein each of the plurality of notifications comprises a name of the file, a modifying entity, and the attribute of the file, wherein the modifying entity identifies a program that changed the attribute of the file;

determining a count of a number of times that the notifications that the attribute of the file was changed were received;

selecting a threshold, wherein the selecting the threshold further comprises selecting the threshold that is higher if the modifying entity is trusted by a system administrator and selecting the threshold that is lower if the modifying entity is not trusted by the system administrator; and deciding whether the file includes a suspected virus if the count exceeds the threshold.

2. The method of claim 1, further comprising:

if the deciding is true, sending a warning to the plurality of clients; and if the deciding is false, refraining from sending the warning to the plurality of clients.

3. The method of claim 1, wherein the attribute comprises a size of the file.

4. The method of claim 1, wherein the attribute comprises a certificate of authenticity.

5. The method of claim 1, wherein the attribute comprises an extension of the file.

6. The method of claim 2, wherein the file comprises a registry entry.

7. The method of claim 6, wherein the warning comprises an instruction to delete the registry entry.

8. The method of claim 2, wherein the warning comprises an instruction to execute an anti-virus program.

9. The method of claim 2, wherein the warning comprises an instruction to display a message.

* * * * *